United States Patent
Tumpold et al.

(10) Patent No.: US 11,617,232 B2
(45) Date of Patent: Mar. 28, 2023

(54) EMITTER STRUCTURE AND PRODUCTION METHOD

(71) Applicant: Infineon Technologies AG, Neubiberg (DE)

(72) Inventors: David Tumpold, Kirchheim b München (DE); Sebastian Anzinger, Holzkirchen (DE); Christoph Glacer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/817,155

(22) Filed: Aug. 3, 2022

(65) Prior Publication Data
US 2022/0377851 A1    Nov. 24, 2022

Related U.S. Application Data

(63) Continuation of application No. 16/251,713, filed on Jan. 18, 2019, now Pat. No. 11,490,460.

(30) Foreign Application Priority Data

Feb. 8, 2018  (DE) .......................... 102018201997.5

(51) Int. Cl.
*H05B 3/20*   (2006.01)
*G01J 3/10*   (2006.01)
(Continued)

(52) U.S. Cl.
CPC ................ *H05B 3/20* (2013.01); *G01J 3/108* (2013.01); *G01N 21/1702* (2013.01);
(Continued)

(58) Field of Classification Search
CPC ..... G01N 21/1702; G01N 21/61; G01J 3/108; H05B 3/20; H05B 2203/032
See application file for complete search history.

(56) References Cited

U.S. PATENT DOCUMENTS

| 5,237,867 A | 8/1993 | Cook, Jr. |
| 5,423,212 A | 6/1995 | Manaka |
(Continued)

FOREIGN PATENT DOCUMENTS

| DE | 4320326 A1 | 12/1994 |
| DE | 102013204197 A1 | 10/2014 |
(Continued)

OTHER PUBLICATIONS

Chung-Nan Chen, "Fully quantitative characterization of CMOS-MEMS polysilicon/titanium thermopile infrared sensors", Aug. 29, 2011 (Year: 2011).*

(Continued)

*Primary Examiner* — Maurice C Smith
(74) *Attorney, Agent, or Firm* — Slater Matsil, LLP (57) ABSTRACT

An emitter structure includes a substrate with a membrane arrangement. The membrane arrangement includes at least one first membrane, a first heating path and a second heating path in different substrate planes. The first heating path and the second heating path are positioned with respect to one another such that a projection of the first heating path and a projection of the second heating path onto a common plane lie at least partly next to one another in the common plane.

20 Claims, 8 Drawing Sheets

(51) Int. Cl.
  *G01N 21/17* (2006.01)
  *G01N 21/3504* (2014.01)
  *H05B 3/03* (2006.01)

(52) U.S. Cl.
  CPC ........... *G01N 21/3504* (2013.01); *H05B 3/03* (2013.01); *G01N 2021/1704* (2013.01); *H05B 2203/032* (2013.01)

(56) References Cited

U.S. PATENT DOCUMENTS

| | | | |
|---|---|---|---|
| 5,804,462 | A | 9/1998 | Liu et al. |
| 2012/0267532 | A1 | 10/2012 | Udrea et al. |
| 2014/0262838 | A1 | 9/2014 | Fix et al. |
| 2015/0233831 | A1 | 8/2015 | Ito et al. |
| 2016/0240762 | A1 | 8/2016 | Carr |
| 2017/0288125 | A1 | 10/2017 | Glacer |

FOREIGN PATENT DOCUMENTS

| | | |
|---|---|---|
| DE | 102014207829 A1 | 10/2015 |
| DE | 102017106593 A1 | 10/2017 |
| EP | 0629862 A1 | 6/1994 |
| WO | 2018106193 A1 | 6/2018 |

OTHER PUBLICATIONS

Woo-Jin Hwang, "Development of Micro-Heaters with Optimized Temperature Compensation Design for Gas Sensors", Mar. 1, 2011 (Year: 2011).*

Jan Spannhake, "High-temperature MEMS Heater Platforms: Long-term Performance of Metal and Semiconductor Heater Materials", Jul. 12, 2005 (Year: 2005).*

K P Yoo, "Fabrication, characterization and application of a microelectromechanical system (MEMS) thermopile for non-dispersive infrared gas sensors", Apr. 14, 2011 (Year: 2011).*

Barritault, Pierre, "Mid-IR source based on a free-standing microhotplate for autonomous CO2 sensing in indoor applications", Feb. 9, 2011, 7 pages.

Barritault, Pierre "Low power CO2 N DIR sensing using a micro-bolometer detector and a micro-hotplate IR-source", France, Eysevier, Sensors and Actuators B, Mar. 21, 2013, 6 pages.

Calaza, C., "A MEMS-based thermal infrared emitter for an integrated NDIR spectrometer", Proceedings of SPIE, vol. 8066, 806627, Czech Republic, May 5, 2011, 9 pages.

Haus-Automatisierung, "Sonoff Tei I 22—Son off RF Bridge mit alien Codes nutzenl I haus-automatisierung.com [ 4K]", Dec. 11, 2018, 1 page.

* cited by examiner

EMITTER STRUCTURE AND PRODUCTION METHOD

This application is a continuation of U.S. patent application Ser. No. 16/251,713, filed Jan. 18, 2019, which application claims the benefit of German Application No. 102018201997.5, filed on Feb. 8, 2018, which applications are hereby incorporated herein by reference.

TECHNICAL FIELD

Exemplary embodiments relate to an emitter structure comprising a membrane arrangement comprising at least two membranes, and to a corresponding production method. Further exemplary embodiments relate to a non-dispersive infrared sensor system and to a photoacoustic spectroscopy system comprising a corresponding emitter structure.

BACKGROUND

Detecting environmental parameters such as noise, sounds, temperatures or gases, for example, is becoming more and more important in the case of mobile terminals, domestic automation systems or sensors for the automotive sector. Gas sensors, in particular, are playing an ever more important part here in order to detect for example harmful gas concentrations on account of air contamination or malfunctions of installations. In accordance with the general development trend, gas detectors of this type ought to be able to be produced expediently and to be distinguished by permanent availability and high precision.

NDIR sensor systems (non-dispersive infrared sensor systems) constitute a spectroscopic device for gas detection. This spectroscopic device typically comprises a source of infrared radiation, a tube (curvette) containing the gas to be analyzed, radiation being transmitted through said tube, and also an infrared detector (and possibly a wavelength filter). The concentration of the gas sought is determined electro optically on the basis of the absorption of a specific wavelength in the infrared spectrum. One of the components having the highest influence on the measurement quality is the infrared radiation source. For the latter it is possible to use infrared lasers, infrared LEDs or thermal MEMS infrared sources, for example.

SUMMARY

Exemplary embodiments of the present invention provide an emitter structure comprising a substrate having a membrane arrangement. The membrane arrangement comprises at least one first membrane, a first heating path and a second heating path. The two heating paths are arranged in (mutually) different substrate planes, wherein the first and second heating path are positioned with respect to one another (e.g. on the membrane if one membrane is assumed, or a respective membrane if a plurality of membranes are assumed) such that a projection (perpendicular to the substrate) of the first heating path and a (parallel) projection of the second heating path onto a common plane are imaged at least partly next to one another in the common plane. To put it another way that means that the two heating paths are thus positioned such that they do not or substantially do not overlap. This has the advantage that the emitter structure constitutes a heating structure in the sense of a temperature source in which a (to the greatest possible extent) homogenous temperature emission profile (e.g. for emitting infrared radiation) is generated over the emission surface (e.g. the topmost membrane).

There are two variants for realizing the arrangement of the two heating paths at different substrate planes. In accordance with one exemplary embodiment, the membrane arrangement comprises the first membrane, with a first heating path on a first main surface of the first membrane (e.g. on a top side) and the second heating path on a second main surface configured opposite the first main surface (i.e. e.g. the underside). In this case, it is advantageous if the membrane is thick enough to give rise to a spacing apart of the two heating paths.

In accordance with a second exemplary embodiment, the membrane arrangement can comprise a first and a second membrane, each of which then accommodates one of the two heating paths. In this case, accommodates means that the heating structure (heating path) are applied on the top side or the underside or are integrated directly into said membrane (integrated in the sense of embedded).

In accordance with exemplary embodiments, the emitter structure can be used as infrared source in an NDIR (non-dispersive infrared sensor) system or in a photoacoustic spectroscopy system for gas detection. Consequently, the exemplary embodiments provide a non-dispersive infrared sensor system comprising an infrared sensor element and a corresponding emitter structure, and also a photoacoustic spectroscopy system comprising an infrared sensor and an emitter structure. On account of the homogenous temperature distribution, a very accurately controllable and homogenous emission of the infrared radiation is effected, such that the measuring systems produced by means of the emitter structure explained above yield very accurate results. Since such MEMS emitter structures are also able to be produced cost effectively, the systems described combine the advantages of cost effective production and very good metrological properties.

Exemplary embodiments are not restricted to emitter structures comprising two membranes and two heating paths, such that an emitter structure having the above arrangement and also a third membrane in the membrane arrangement is provided in accordance with further exemplary embodiments. The third membrane likewise comprises a third heating path. The third heating path is arranged such that a projection of the third heating path onto the common plane lies next to the projection of the second heating path and/or next to the projection of the first heating path. The homogenous emission characteristic can be optimized further by means of the third or each further membrane layer having a heating element. Furthermore, it should be noted at this juncture that the heating paths are generally connected in parallel, such that the overall arrangement of the heating elements enables low resistance operation, that is to say is advantageous with regard to the power demand.

In accordance with exemplary embodiments, the projection of the first heating path relative to the projection of the second heating path can be spaced apart from one another at least in a region along the first and the second heating path. Moreover, the projection of the first heating path and the projection of the second heating path can also adjoin and overlap one another at least in a region along the first and the second heating path. If meander shaped heating paths are assumed, for example, the meander structures always run parallel to one another in the projection, such that no overlap arises. However, if ring shaped structures are assumed, then an overlap of the projection areas of the two heating paths can arise at least by virtue of the connection region of the inner ring. In accordance with exemplary embodiments, the first and/or the second heating path have/has—depending on the desired purpose of use—a meander shape and a ring shape or else an area shape. In accordance with further exemplary embodiments, each heating path is constituted by a metallization applied on the membrane, a doping or some other resistance element.

As already mentioned above, in accordance with exemplary embodiments, an emission region that emits the infrared radiation is formed by a membrane, in particular the first membrane. When looking at this emission region, the arrangement explained above makes it possible that, in accordance with exemplary embodiments, a projection area of the first heating path together with a projection area of the second heating path forms a larger projection area than each projection area by itself. By way of example, the projection area can be 1.3 or 1.5 or even 2.0 times the magnitude of one of the projection areas alone. Preferably, the common projection area forms exactly the sum of the projection area of the two heating paths. In accordance with further exemplary embodiments, the membrane arrangement can comprise an additional membrane designed for the emission. Said additional membrane is configured to distribute a thermal energy induced by the first and/or the second heating path over a lateral area of the further membrane and/or accordingly to emit the infrared radiation. This affords the advantage of further optimizing the emission characteristic.

In accordance with exemplary embodiments, the substrate comprises an opening, such as e.g. an opening produced by means of the Bosch method, or a trench (deep trench), in which the membranes are arranged. In the case of a trench, the membranes together with the trench form a cavity. The opening or cavity has the advantage that these regions do not serve as a heat sink and the response time and overall the heating capacity are thus improved. In accordance with exemplary embodiments, the membranes are spaced apart from one another, such that an interspace is formed between the membranes. In accordance with further exemplary embodiments, said interspace can be filled with a gas or fluid, for example. This filling has the purpose or advantage that the membranes are thermally coupled to one another in order to produce the desired temperature profile or temperature pattern on the first membrane (topmost or bottommost membrane). In order, in accordance with exemplary embodiments, to allow the enclosed gas to escape upon its expansion on account of the heating, the first and/or the second membrane can comprise a ventilation opening. Alternatively, the ventilation opening can also be provided in the substrate. These ventilation openings have the advantage of the membrane not being mechanically loaded on account of thermal expansion and change in volume owing to the heating of the enclosed gas.

In accordance with a further exemplary embodiment, the emitter structure comprises an integrated ASIC configured to drive the first and the second heating path. In this case, by way of example, a DC or AC excitation can be induced by the ASIC, wherein, by way of example, an AC excitation in the radio frequency range (e.g. 100 megahertz) enables an optimization of the temperature profile. In accordance with exemplary embodiments, the heating elements of the individual membranes can also be driven separately from one another in order to vary the temperature profile or generally to vary the temperature. In accordance with one advantageous variant, the temperature of the neighboring membrane can be determined by means of the pattern from the heating path in order thus to carry out the control in a more targeted manner.

A further exemplary embodiment provides a method for producing an emitter structure comprising the central step of forming a membrane arrangement in a substrate comprising shaping a first membrane with a first heating path and shaping a second membrane with a second heating path, such that the first and the second membrane are arranged with respect to one another in such a way that a projection of the first heating path and a projection of the second heating path onto a common plane lie at least partly next to one another. In accordance with a further exemplary embodiment, the method can also be extended by the previous step of introducing a trench or an opening, wherein the step of forming the membrane arrangement is then carried out such that the first and/or the second membrane are/is arranged in the opening or the trench. As already indicated above, the method has the advantage that an emitter structure which offers advantageous measurement properties by comparison with other emitter structures produced by means of MEMS technologies can be produced in a cost effective manner by means of this method.

BRIEF DESCRIPTION OF THE DRAWINGS

Developments are defined in the dependent claims. Exemplary embodiments are explained with reference to the accompanying drawings, in which:

DETAILED DESCRIPTION OF ILLUSTRATIVE EMBODIMENTS

Before exemplary embodiments are explained in detail below with reference to the accompanying drawings, it should be pointed out that identically acting elements and structures are provided with identical reference signs, such that the description thereof is applicable to one another or mutually interchangeable.

Figure 1:
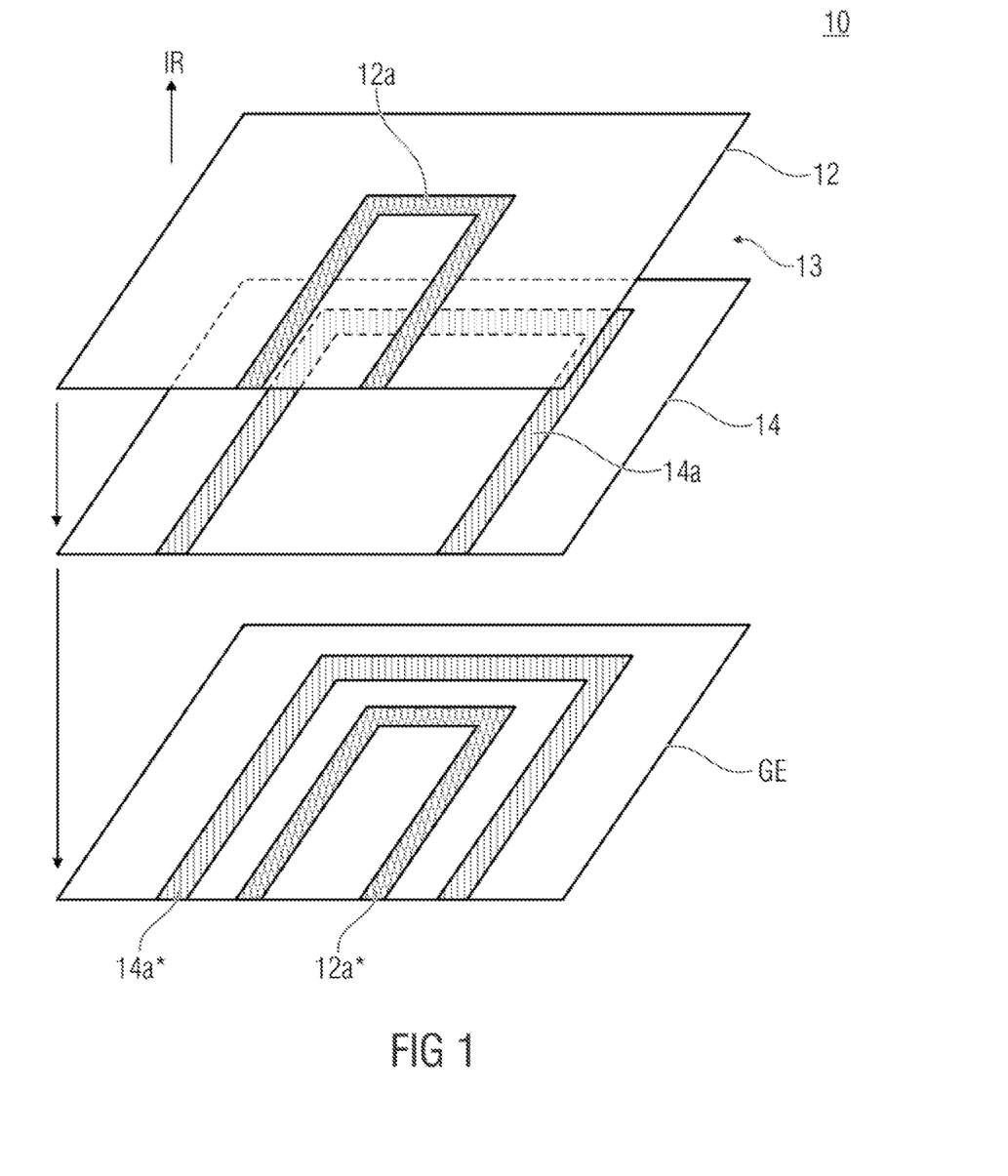
FIG. 1 shows a schematic illustration of an emitter structure in accordance with one basic exemplary embodiment.

FIG. 1 shows an emitter structure 10 for emitting heating energy, e.g. infrared radiation. In this exemplary embodiment, the heating energy is emitted for example in the direction of the arrow IR. The emitter structure 10 illustrated here is illustrated schematically as a three dimensional representation without additional elements such as the substrate in which the membrane arrangement is introduced. The emitter structure 10 comprises a membrane arrangement, such as a membrane stack, for example, which is formed by the two membranes 12 and 14. These membranes 12 and 14 are arranged parallel/substantially parallel and in an overlapping fashion with respect to one another, i.e. at least partly overlapping or preferably even congruent. It should be noted at this juncture that even if the membranes 12 and 14 are illustrated with a quadrilateral shape, they can, of course, also have a round shape or some other freeform shape. In accordance with one exemplary embodiment, both membranes 12 and 14 are spaced apart from one another, such that an interspace 13 is formed therebetween, which interspace can be filled e.g. with a gas (e.g. air) or fluid (generally: electrically insulating material).

Each of the membranes 12 and 14 comprises a heating element in the form of a heating path 12a and 14a, respectively. The first heating path 12a associated with the first membrane 12 extends along an arbitrary shape, such as e.g. the U-shape illustrated here or along a meander shape on or in the associated first membrane 12. Analogously thereto, the second heating path 14a likewise extends along the surface of the associated membrane 14 with an arbitrary shape. Both heating paths 12a and 14a are shaped from a lateral standpoint such that they are arranged in a non-overlapping fashion, which is explained below with reference to the projection of the two heating paths 12a and 14a onto a common plane GE.

The projection of the heating path 12a is identified by means of the reference sign 12a*, while the projection 14a is identified by the reference 14a*. The projection is effected perpendicular to the membranes 12 and 14 or perpendicular to the substrate (not illustrated) accommodating the membrane arrangement 12+14 of the emitter structure 10. As a result, the projection plane GE thus lies substantially parallel to a main surface of the substrate or to the membranes 12 and 14. As can be discerned, the projection areas 14a* and 12a* extend substantially next to one another or, in this exemplary embodiment, completely next to one another. This arrangement next to one another in the projection onto the common plane GE results because the heating elements 12a and 14 are arranged in a manner significantly offset with respect to one another in order to achieve a temperature distribution that is as homogenous as possible at the topmost membrane upon activation of said heating elements, as will also be explained below.

It should be pointed out at this juncture that, in accordance with exemplary embodiments, it suffices for the projections 14a* and 12a* to extend next to one another regionally, such that individual small overlaps or intersection points of the projections 12a* and 14a* would be conceivable, wherein this overlap can originate for example from contacting lines. Even if in this exemplary embodiment the illustration was such that there is a distance between the projections 14a* and 12a*, it would, of course, also be possible for said projections to directly adjoin one another or even partly overlap one another.

Now that the emitter structure 10 has been explained with regard to its structure, the functioning will be discussed below.

Each of the heating paths 12a and 14a is conductive (e.g. metallized or doped) and emits a dedicated temperature profile upon excitation with a voltage (DC or AC), said temperature profile in principle following the shape of the conductors 12a and 14a. By virtue of the fact that, rather than one plane, a plurality of planes with individual heating paths 12a and 14a are provided and said heating paths also lie in a manner spatially offset with respect to one another, at the emission surface of the emitter structure 10, e.g. at the surface of the membrane 12, upon emission in the direction IR, a homogenous temperature distribution is achieved as a result of superimposition of the individual temperature distributions. With elements of this type it is possible to achieve a temperature emission (directly at the element) in the range of from room temperatures (starting from 20° C.) up to 600° C.

For the purpose of preferred driving in accordance with exemplary embodiments: the emitter structure 10 or the resulting layer stack 12+14 comprising the heating paths 12a and 14a forms an arrangement of resistance and impedance elements, wherein the elements of the different layers are preferably connected in parallel, which enables low resistance driving with a correspondingly low total power. The heating elements can be configured as resistive elements, for example, such that a temperature increase is brought about by a DC or an AC excitation. Alternatively, a design as an impedance element would also be possible, such that an AC excitation (e.g. in the megahertz range) brings about a temperature emission by means of the impedance element.

Even if, in exemplary embodiments above, it was assumed that the membrane arrangement comprises the membranes 12 and 14, in accordance with further exemplary embodiments the same concept can also be realized with one membrane, e.g. one thick membrane, in the case of which a respective heating structure (heating path 12a and 14a) is provided on the top side and on the underside. This approach of the single membrane as membrane arrangement having different heating structures in different topologies is advantageous on account of the simple producability. Furthermore, it should be noted that, in accordance with further exemplary embodiments, said single membrane or each membrane can also comprise heating structures in the membrane itself, in order to form e.g. a third heating path.

Figure 2A:
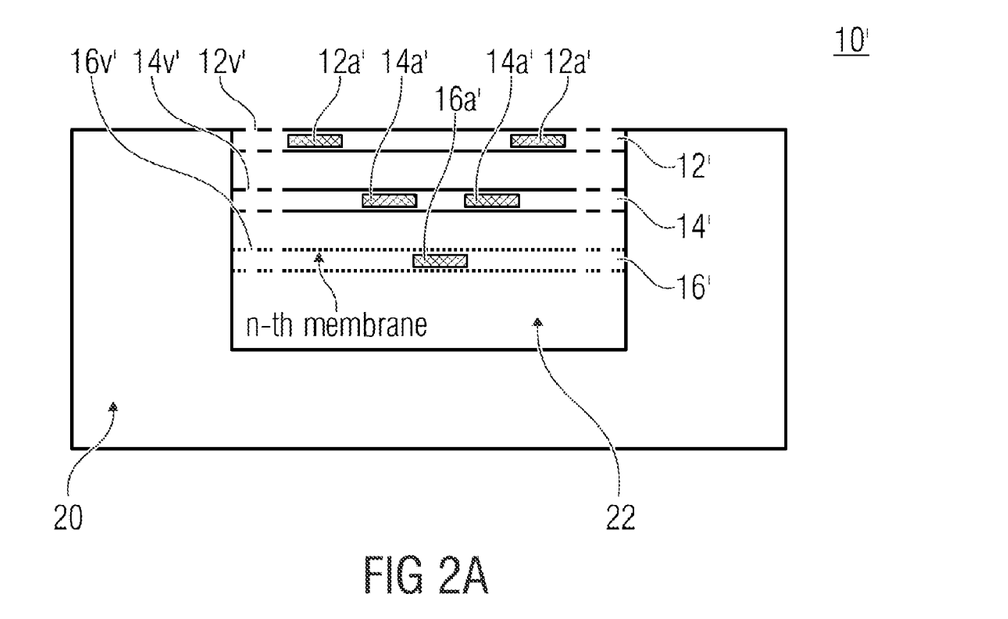
FIG. 2a shows a schematic sectional illustration of an emitter structure in a substrate with a trench in accordance with one exemplary embodiment.

FIG. 2a shows an emitter structure 10', here comprising 3 or generally n membranes 12', 14' and 16' (silicon or generally semiconductor membranes) arranged in a trench 22 of the substrate 20 (bulk substrate). A cavity is formed below the bottommost membrane 16'. Each membrane 12', 14' and 16' (e.g. polysilicon membrane) comprises heating elements, here provided with the reference sign 12a'. As can be discerned, the heating elements 12a', 14a' and 16a' are arranged in a manner offset with respect to one another, i.e. thus the membrane elements 14a' between the membrane elements 12a' and the membrane element 16a' between the membrane elements 14a'.

Figure 2B:
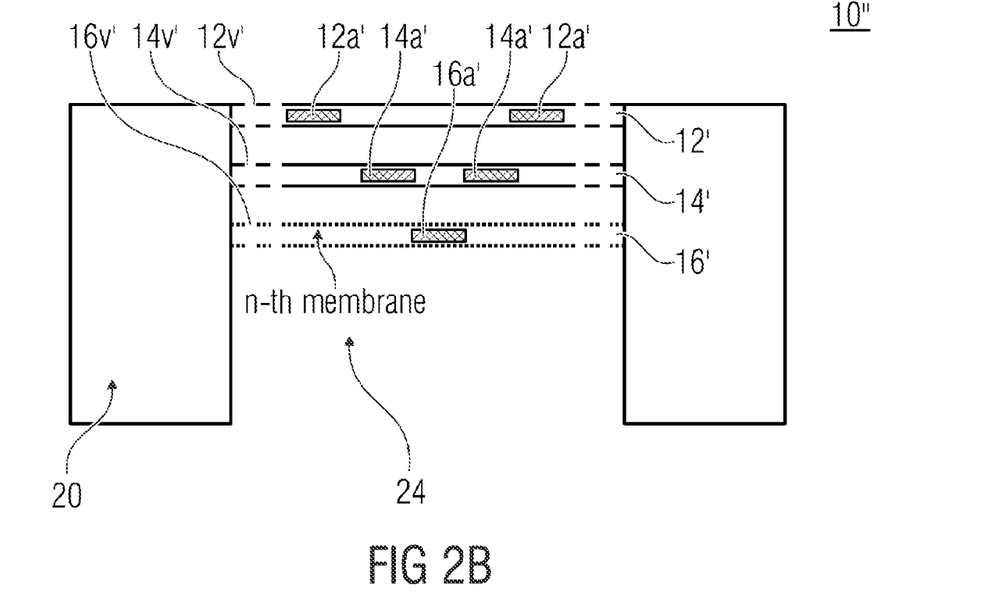
FIG. 2b shows a schematic sectional illustration of an emitter structure in a substrate with an opening in accordance with a further exemplary embodiment.

A further exemplary embodiment is illustrated in FIG. 2b, which shows the emitter structure 10". The latter in turn has the three membranes 12', 14' and 16' with the associated heating elements 12a', 14a' and 16a', wherein here the membranes 12', 14' and 16' are not arranged in a trench but rather in an opening introduced into the substrate 20 for example by means of the Bosch process. The opening is provided with the reference sign 24.

As already indicated above, the membranes 12', 14' and 16' are preferably composed of polysilicon since this material has a high emissivity. As already explained above, the heating elements 12a', 14a' and 16a' can be shaped as doped regions in the membranes 12', 14' and 16' or else comprise other electrical elements having heating properties, i.e. thus having a high power loss in the structure. That is to say therefore in other words that a resistance, of whatever kind, is generally used.

In accordance with exemplary embodiments, the membranes 12', 14' and 16' can have ventilation openings, identified here with the reference signs 12v', 14v' and 16v' (cf. FIG. 2a and FIG. 2b). Said ventilation openings connect the interspaces between the membranes 12', 14' and 16' to one another and additionally also connect the interspaces to the exterior region, i.e. thus e.g. in a direction toward the emission area or in the opposite direction toward the cavity 22 or the opening 24. The purpose of these ventilation openings 12v', 14v' and 16v' is to enable pressure equalization, in particular excess pressure, by virtue of the fact that the gas volume enclosed between the membranes 12', 14' and 16' can escape through the ventilation openings 12v', 14v' and 16v' if said gas volume expands on account of the thermal expansion. A further advantage afforded by said openings 12v', 14v' and 16v' is that thermal insulation vis à vis the substrate 22 is improved on account of the fact that, by virtue of the ventilation openings 12v', 14v' and 16v', the membrane is perforated and as it were the thermal bridge is reduced.

Figure 3A:
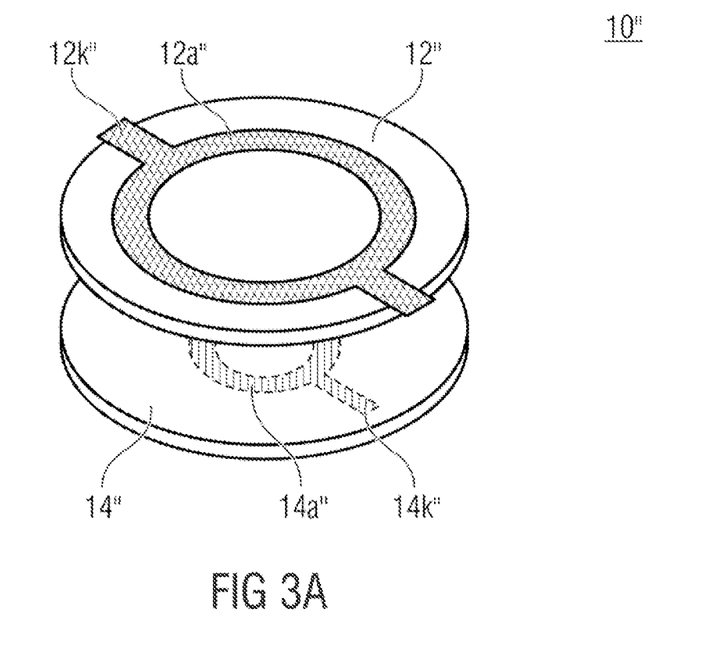
FIG. 3a-3c show schematic partial views of membranes for illustrating the arrangement of the heating paths in accordance with exemplary embodiments.
Figure 3B:
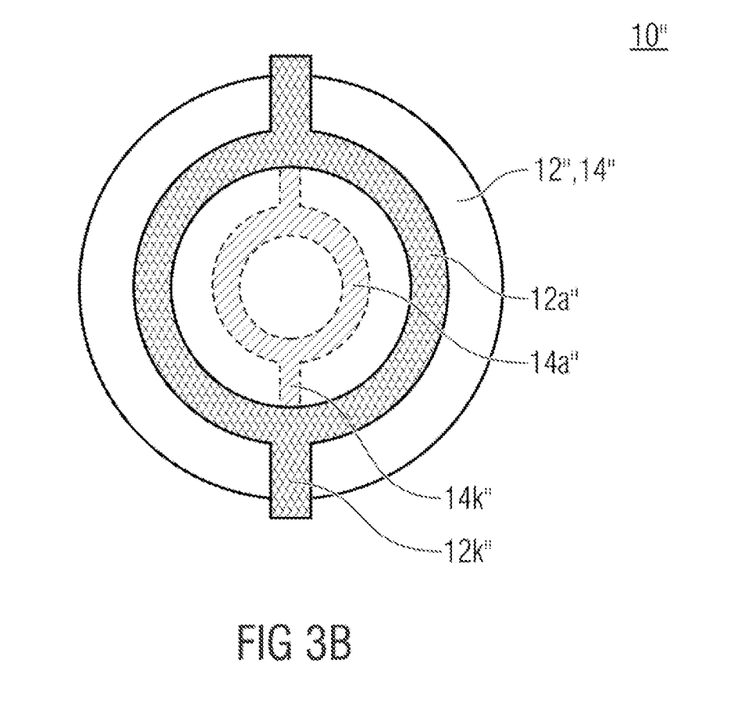

Referring to FIGS. 3a and 3b, an explanation will now be given of how the geometric design of the heating elements 12a'' and 14a'' of the emitter structure 10'' can be configured. In the exemplary embodiment from FIGS. 3a and 3b, it is assumed that the first heating element 12a'' and also the second heating element 14a'' have a ring shape. In this case, FIG. 3a illustrates a three dimensional illustration of the two associated membranes 12'' and 14'' with the heating elements 12a'' and 14a'', while FIG. 3b shows a plan view or a frontal view of the projection.

It is evident in the projection illustration, in particular, that both heating elements 12a'' and 14a'' are interleaved in one another in a ring shape fashion, although the electrical contactings (cf. 12k'' and 14k'') are arranged in a manner overlapping one another, with the result that a region of contact or overlap region thus arises.

In accordance with exemplary embodiments, this contacting region can also be arranged in a manner offset with respect to one another in order to avoid hot spots here on account of the supply of energy. In the case of such arrangements, the contacting region 12k'' would then be arranged at a different position, e.g. in the manner distributed over the circumference of the membrane 12''/14'', compared with the contacting region 14k''.

Figure 3C:
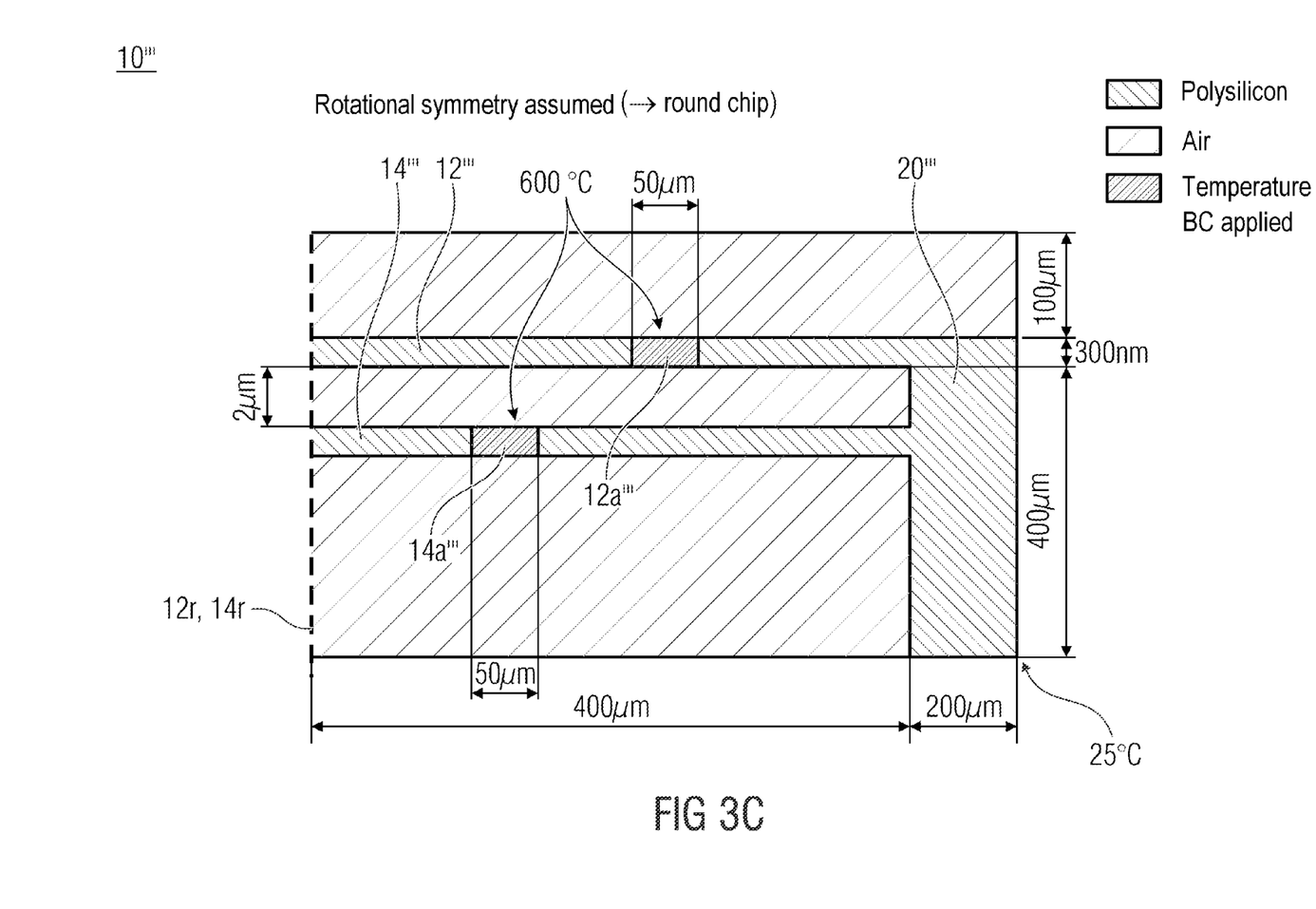

FIG. 3c shows a sectional illustration through an emitter structure 10'''. Since the heating elements 12a''' and 14a''' and also the membranes 12''' and 14''' are rotationally symmetrical, only an excerpt around the rotation axis 12r, 14r is illustrated here. In the outer region, the membranes 12''' and 14''' are held by the substrate 20'''.

With regard to the dimensioning, it should be pointed out by way of example that it is assumed here that each membrane has a thickness in the 100 nm range, while the height of the cavity extends over a range of hundreds of µm. The two membranes are spaced apart a few µm from one another, said membranes having a diameter of a few 100 µm. Each conductor track has approximately a width of a few 10 µm. All these indications should be understood as value ranges, such that the membrane thus has a diameter of 100 to 3000 µm, and the cavity can have a depth of 100 to 1000 µm. Likewise, the thickness of each membrane can vary in the range of 100 nm to 2000 nm, wherein the distance would then also vary with the order of magnitude of 1 µm to 5 µm. The chosen diameters of the conductor tracks of the heating elements depend essentially on the desired impedance and can vary between 5 and 300 µm.

Figure 4A:
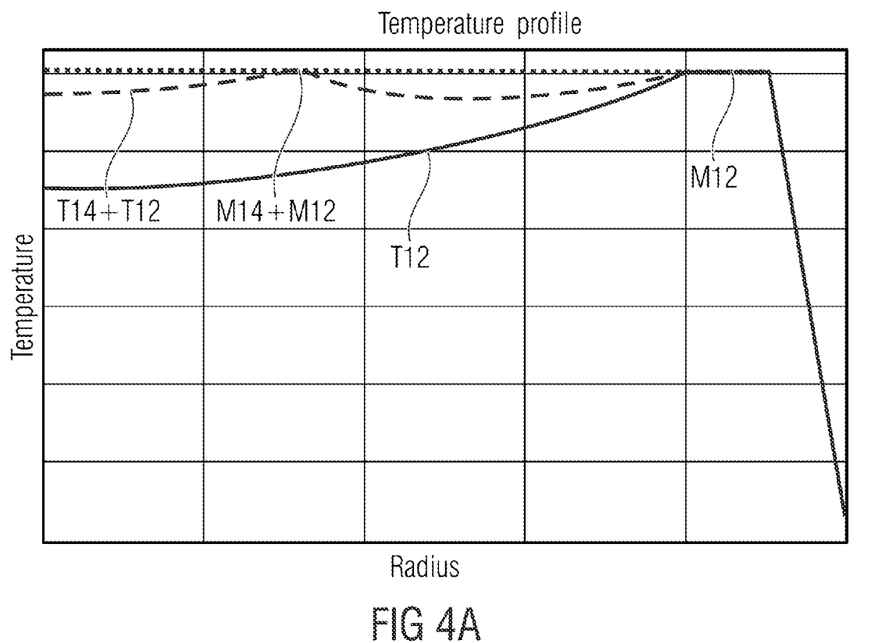
FIGS. 4a and 4b show diagrams for comparing a resulting temperature profile in the case of emitter structures in accordance with exemplary embodiments.

Referring to FIG. 4a, a possible temperature distribution is discussed below on the basis of the emitter structure 10''', wherein it is pointed out that the heating elements 12a''' and 14a''' are heated at 600° C. As illustrated, what is advantageously achieved is that the substrate 20 has a significantly lower temperature, e.g. room temperature of 25° C. (generally at least 10 times lower).

Figure 4B:
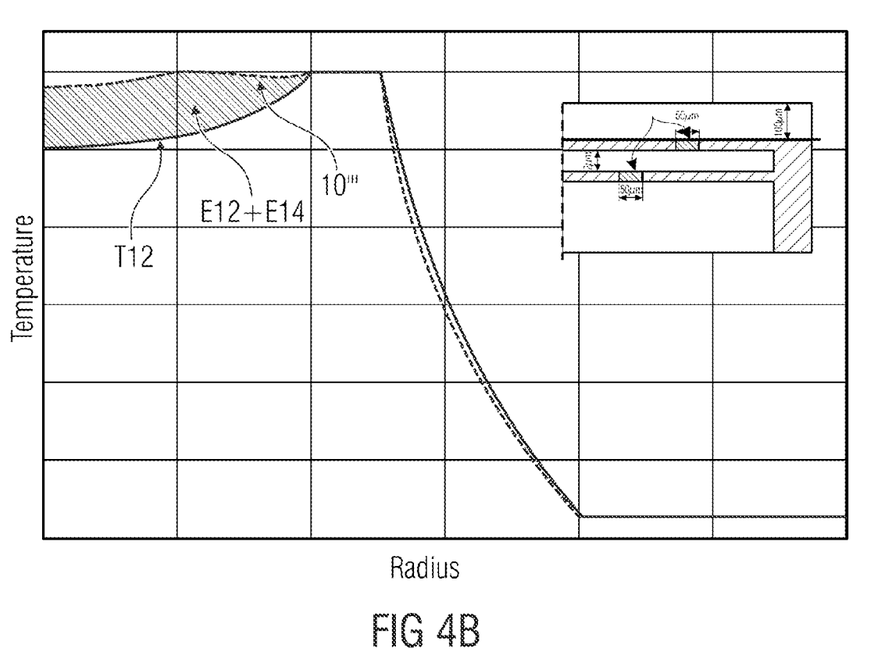

FIG. 4a illustrates the temperature profile on the basis of only the upper membrane 12''' with the reference sign T12. As can be discerned, this temperature profile T12 has the maximum M12 in the outer region. The temperature profile resulting from parallel operation of the heating elements 12a''' and 14''', said temperature profile being illustrated with the reference sign T14+T12, is significantly increased in comparison with the temperature profile T12, an additional maximum M14+M12 also being obtained. In FIG. 4b, the additional energy gain introduced by the multi dual membrane 10''' is identified by means of hatching (cf. reference sign E12+E14).

Figure 4C:
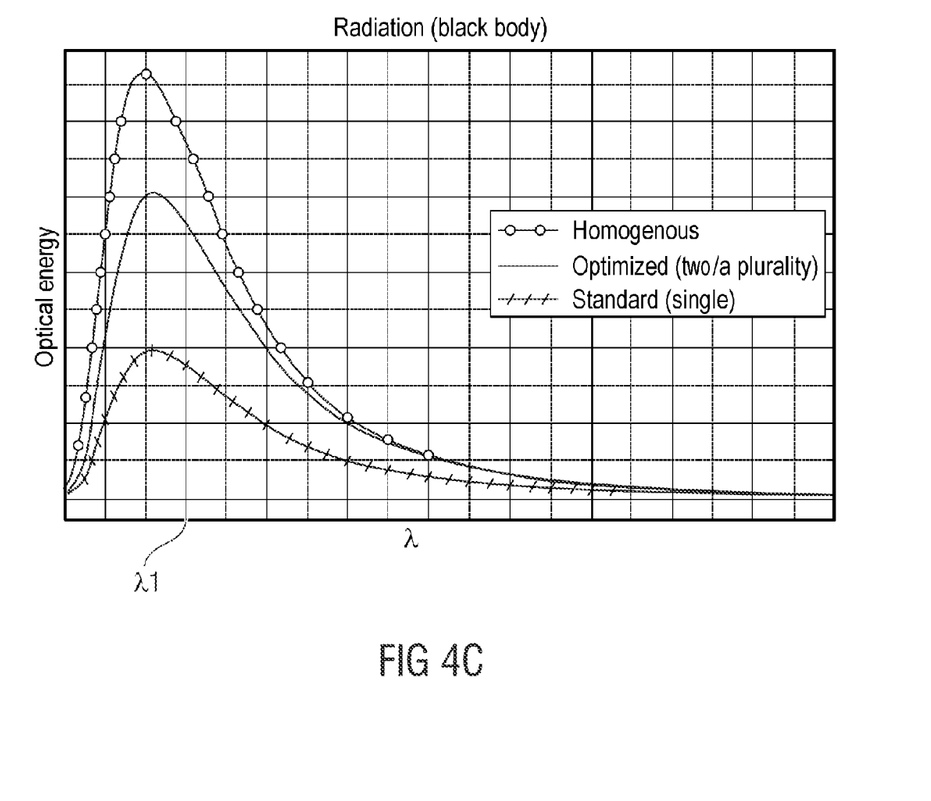
FIG. 4c shows a further diagram for comparing a resulting temperature profile in accordance with exemplary embodiments.

FIG. 4c shows the optical energy plotted against the wavelength for a homogenous heating element (cf. curve having the dots), a standard single heating element (cf. line having the strokes) and the optimized heating element having the two or the plurality of membranes. As can be discerned, the optical energy at the wavelength $\lambda_1$ approximates to the homogenous heating element, such that a significant improvement can be achieved in comparison with the standard heating element.

Referring to FIGS. 5a to 5d, an explanation will now be given of patterns in which the heating elements 12a and/or 14a from FIG. 1 or else from the other exemplary embodiments can be arranged.

Figure 5A:
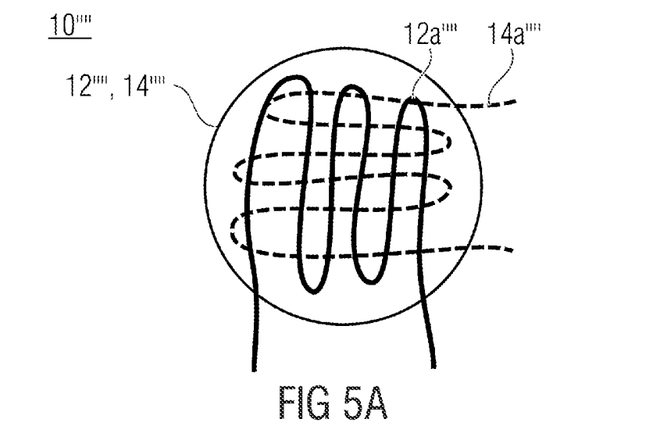
FIG. 5a-5d show variants of the lateral design of heating paths in emitter structures in accordance with exemplary embodiments.

FIG. 5a shows the emitter structure 10'''' or the plan view of the associated membranes 12'''' and 14''''. As can be discerned, each membrane comprises a meander shaped heater provided with the reference sign 12a'''' or 14a'''', respectively. The two meander shaped heaters 12a'' and 14a'' are offset by 90° with respect to one another, which affords the advantage of achieving a large area with the resulting emission pattern. Furthermore, the connections are also oriented differently.

Figures 5B, 5C:
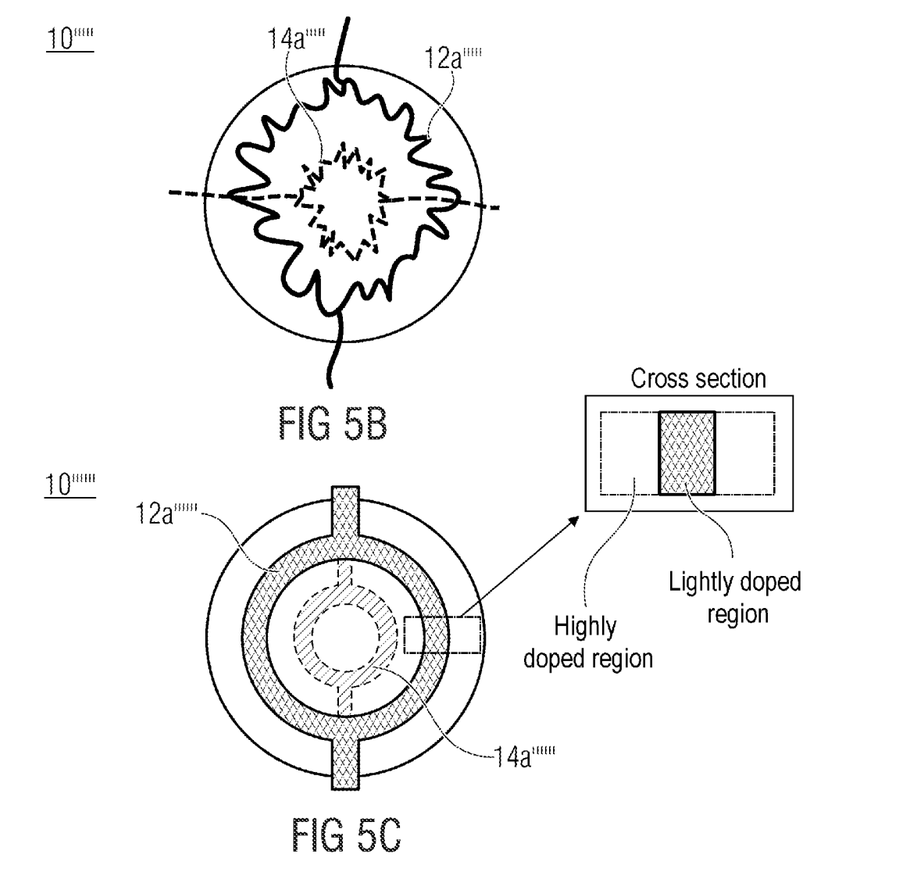

FIG. 5b shows an emitter structure 10''''' comprising the two heating elements 14a''''' and 12a''''', wherein both heating elements 12a''''' and 14a''''' are embodied as so called ring meanders. In this case, the ring meander 14a''''' is smaller than the ring meander 12a''''' with regard to its diameter. In this case, it should also be mentioned advantageously that the two ring meanders 12a''''' and 14a''''' have their contactings respectively on different sides, such that no hot spots can arise here either.

FIG. 5c shows an emitter structure 10'''''' comprising two ring shaped elements 12a'''''' and 14a'''''', wherein an enlarged illustration shows that the heating element itself is formed by a lightly doped region, while the region surrounding the heating element can be constituted by a highly doped region.

Figure 5D:
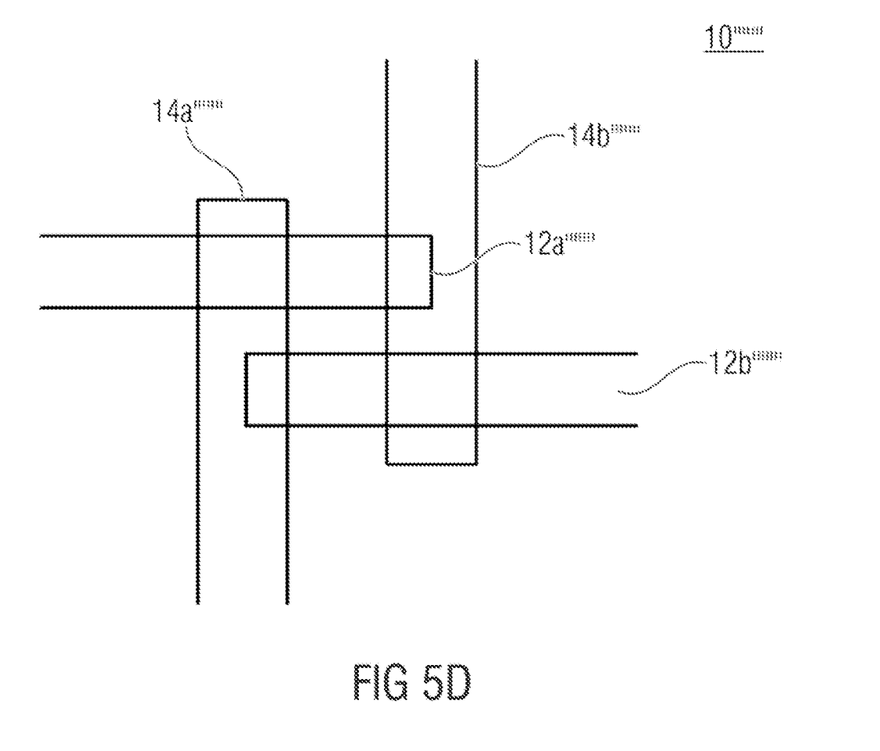

FIG. 5d shows a further exemplary embodiment, wherein two (or possibly more) heating elements 14a''''''' and 14b''''''' or respectively 12a''''''' and 12b''''''' are provided per membrane. In this exemplary embodiment it becomes clear that a plurality of heating elements can be arranged next to one another per membrane.

It should be noted at this juncture that even if, in exemplary embodiments above, it was always assumed that the heating track is embodied as a track, planar elements such as heating plates, for example, can also be provided.

In accordance with a further exemplary embodiment, an additional emission membrane can additionally be provided on the emission side, i.e. on the membrane 12 for example in the case of the emitter structure 10 from FIG. 1. Said additional emission membrane can have higher emission properties in comparison with the membrane 12, which then advantageously distribute the emission pattern even more homogenously. A suitable material for this further (emission) membrane is polysilicon owing to the improved emission properties in comparison with standard silicon membranes.

Even if, in exemplary embodiments above, it was always assumed that emission takes place via the membrane 12, nevertheless it is also possible for the temperature emission to take place via the lower membrane.

Referring to the dimensioning of the membranes and the choice of filling for the interspaces, it should be noted that these can be used to adapt the properties of the element (thermal capacity and reaction time). If a fluid or a solid is present e.g. in the interspace, the optical reaction time is reduced since the thermal capacity is also reduced.

Further exemplary embodiments relate to a sensor system (PAS Sensor System or an NDIR Sensor System) comprising an emitter structure as explained above. An additional exemplary embodiment relates to a production method essentially comprising the steps of arranging the membranes with the heating elements in such a way that the heating elements do not overlap, i.e. are preferably arranged next to one another. Conventional MEMS production technologies such as are used e.g. for microphone production can be used in this production method.

In accordance with a further exemplary embodiment, the structure can be connected to an ASIC or generally to a controller that can be used to activate and deactivate or regulate the individual elements. By adapting the power per heating element, it is possible to adapt the thermal profile and thus also the optical emission characteristic/emission pattern. In this case, it is conceivable, for example, for the different heating elements to be driven differently in different planes or else for a temperature sensor on one plane to be taken as a basis for monitoring the temperature of the heater of the other plane in order thus to carry out a control.

Although some aspects have been described in association with a device, it goes without saying that these aspects also constitute a description of the corresponding method, and so a block or a component of a device should also be understood as a corresponding method step or as a feature of a method step. Analogously thereto, aspects described in association with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some exemplary embodiments, some or a plurality of the most important method steps can be performed by such an apparatus.

What is claimed is:

1. An emitter structure comprising:
   a substrate having a membrane arrangement comprising at least one first membrane, a first heating path and a second heating path,
   wherein the first heating path and the second heating path are arranged in different substrate planes,
   wherein the membrane arrangement comprises the first membrane with the first heating path and a second membrane with a second heating path, wherein the first membrane and the second membrane are arranged in different substrate planes in order to arrange the first heating path and the second heating path in different substrate planes,
   wherein the first membrane and the second membrane are spaced apart from one another, such that an interspace is shaped between the first membrane and the second membrane,
   wherein at least one of the first and the second membrane comprise a ventilation opening, such that a gas volume enclosed in the interspace can escape toward the outside in an event of its expansion; and/or
   wherein the substrate comprises a ventilation opening for the interspace, such that an enclosed gas volume can escape toward the outside in the event of its expansion.

2. The emitter structure as claimed in claim 1, wherein the first heating path and the second heating path are positioned with respect to one another such that a projection of the first heating path and a projection of the second heating path onto a common plane lie at least partly next to one another in the common plane.

3. The emitter structure as claimed in claim 2, wherein the projection of the first heating path relative to the projection of the second heating path is spaced apart from one another at least in a region along the first and the second heating path.

4. The emitter structure as claimed in claim 2, wherein the projection of the first heating path and the projection of the second heating path are arranged in a manner adjoining or overlapping one another at least in a region along the first and the second heating path.

5. The emitter structure as claimed in claim 1, wherein the first membrane forms an emission region configured to emit infrared radiation.

6. The emitter structure as claimed in claim 1, wherein a projection area of the first heating path together with a projection area of the second heating path forms a larger projection area than the projection area of the first or the second heating path alone.

7. The emitter structure as claimed in claim 6, wherein a projection area of the first and the second heating path onto a common plane together is at least 1.3 times a magnitude of a projection area of the first heating path or a projection area of the second heating path.

8. The emitter structure as claimed in claim 1, wherein the substrate comprises an opening, in which the membrane arrangement is arranged.

9. The emitter structure as claimed in claim 1, wherein the substrate comprises a trench, in which the membrane arrangement is arranged, wherein the second membrane together with a trench form a cavity.

10. The emitter structure as claimed in claim 1, wherein the interspace is filled with a gas.

11. The emitter structure as claimed in claim 1, wherein the emitter structure comprises a third membrane with a third heating path, wherein the third heating path is arranged relative to at least one of the first and the second heating path such that a projection of the third heating path onto a common plane lies next to the projection of the second heating path and/or next to the projection of the first heating path.

12. The emitter structure as claimed in claim 1, wherein the first heating path and the second heating path have a ring shape; or
   wherein the first heating path and the second heating path have a meander shape.

13. The emitter structure as claimed in claim 1, wherein the membrane arrangement comprises a further membrane configured to distribute a thermal energy induced by the first and/or the second heating path over a lateral area of the further membrane and to emit infrared radiation.

14. The emitter structure as claimed in claim 1, wherein the first and/or the second heating path comprise(s) a doping.

15. The emitter structure as claimed in claim 1, wherein the emitter structure comprises an Application-Specific Integrated Circuit (ASIC) configured to drive the first and the second heating path.

16. A method for producing an emitter structure, the method comprising:
    forming a membrane arrangement in a substrate comprising at least one first membrane, a first heating path and a second heating path,
    wherein the first heating path and the second heating path are arranged in different substrate planes;
    introducing a trench or an opening before forming the membrane arrangement,
    wherein the forming the membrane arrangement comprises forming the membrane arrangement arranged in the opening or the trench.

17. The method of claim 16, wherein the first heating path and the second heating path are positioned with respect to one another such that a projection of the first heating path and a projection of the second heating path onto a common plane lie at least partly next to one another in the common plane.

18. An emitter structure comprising:
    a substrate having a membrane arrangement comprising a first membrane comprising a first heating path and a second membrane comprising a second heating path,
    wherein the first heating path and the second heating path are arranged in different substrate planes,
    wherein the first membrane and the second membrane are spaced apart from one another by an interspace,
    wherein at least one of the first and the second membrane comprise a ventilation opening, such that a gas volume enclosed in the interspace can escape toward the outside in an event of its expansion; and/or
    wherein the substrate comprises a ventilation opening for the interspace, such that an enclosed gas volume can escape toward the outside in the event of its expansion.

19. The emitter structure of claim 18, wherein the first membrane and the second membrane each comprise a quadrilateral shape.

20. The emitter structure of claim 18, wherein the first membrane and the second membrane each comprise a ring shape, a ring meander shape, or a meander shape.

* * * * *